United States Patent Office 3,530,273
Patented Sept. 22, 1970

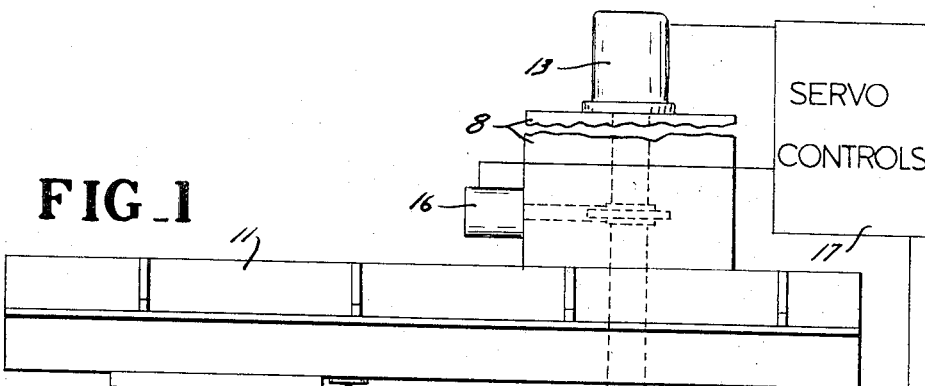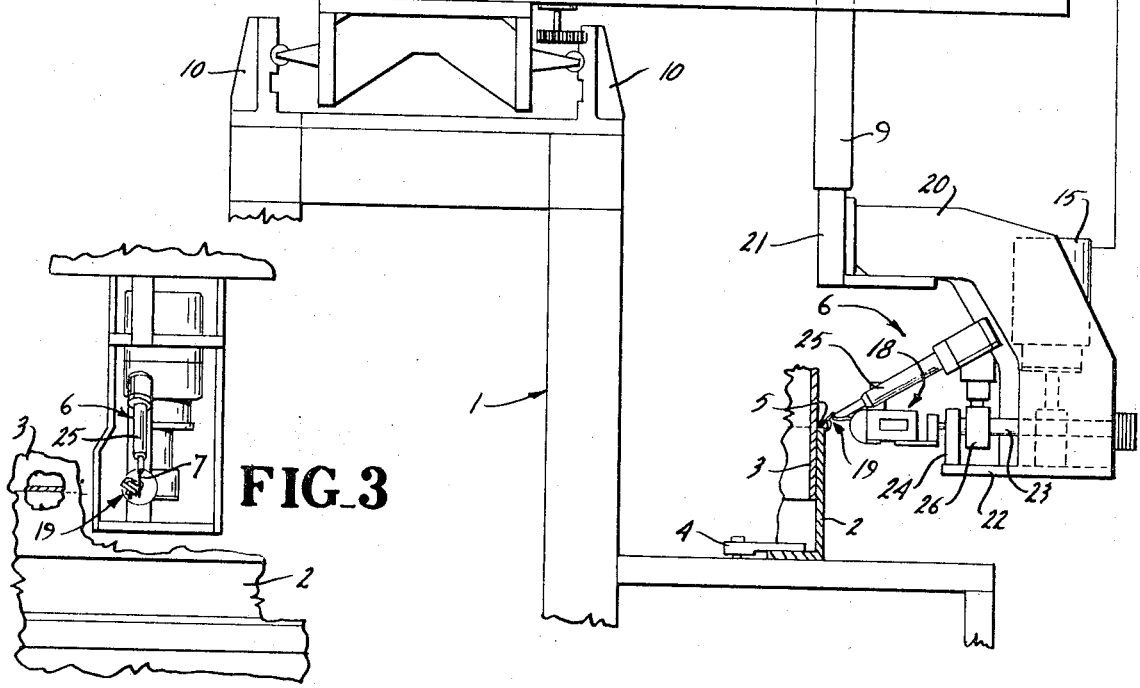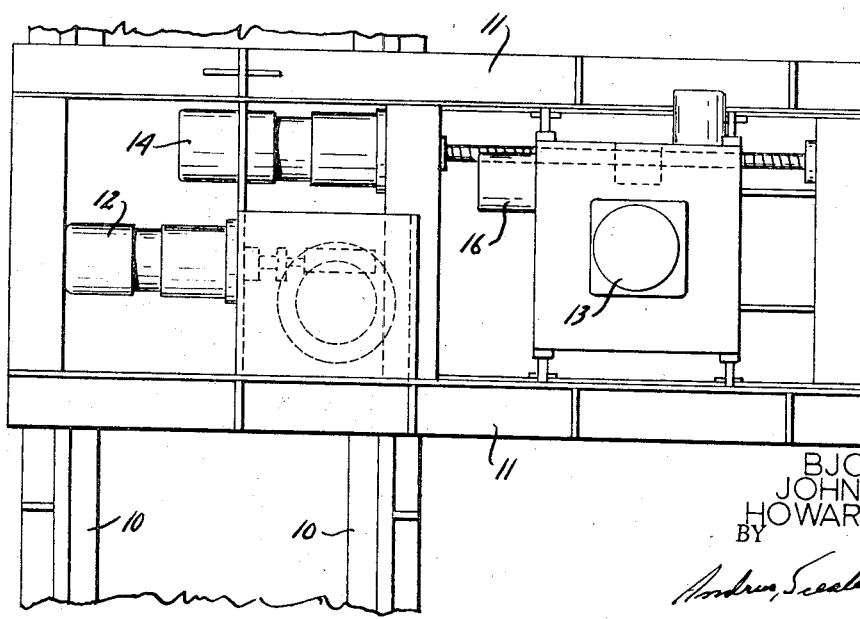

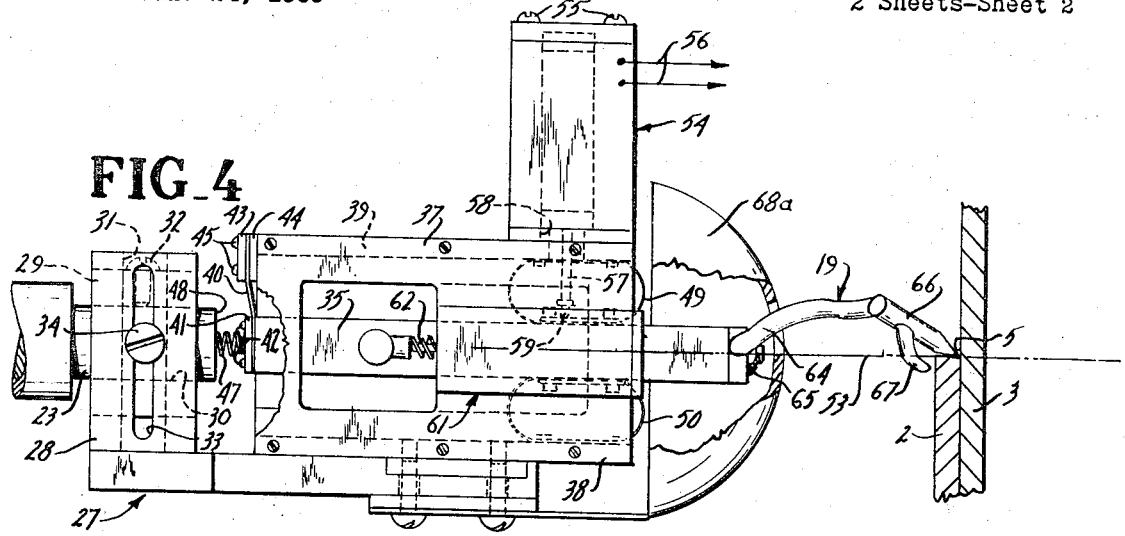
FIG_4
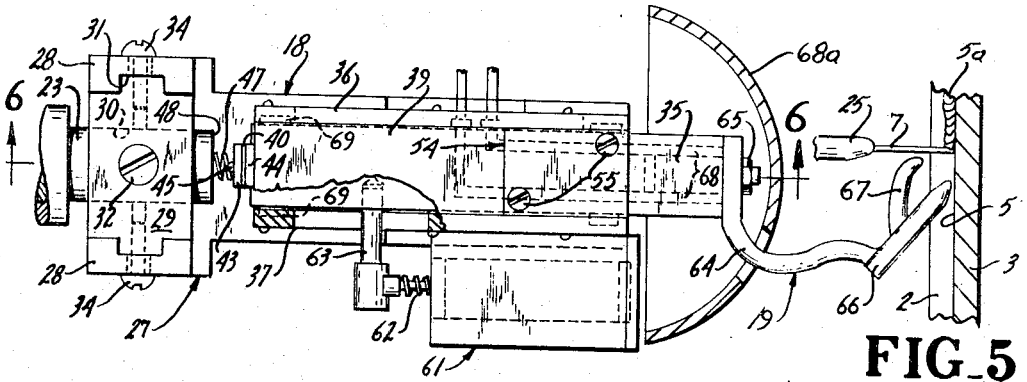
FIG_5
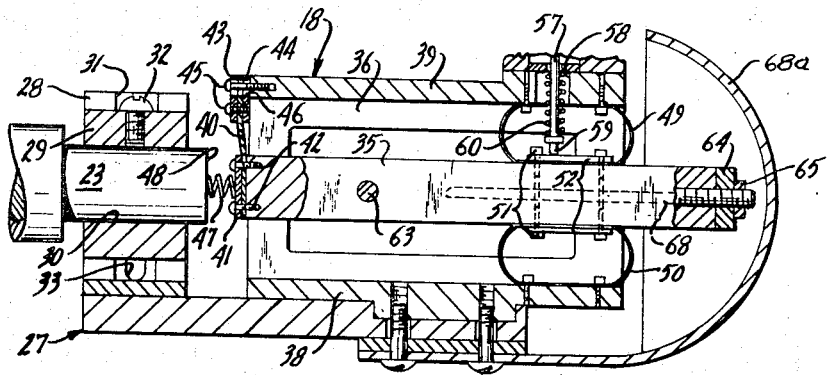
FIG_6
INVENTORS
BJORN BERGLUND
JOHN G. BOLLINGER
HOWARD L. HARRISON
Attorneys

3,530,273
AUTOMATIC TRACER FOR POSITIONING CONTROL
John G. Bollinger and Howard L. Harrison, Madison, Wis., and Bjorn Berglund, Sandvika Baerum, Norway, assignors to A. O. Smith Corporation, Milwaukee, Wis., a corporation of New York
Filed Jan. 24, 1969, Ser. No. 793,860
Int. Cl. B23k 9/12
U.S. Cl. 219—125          15 Claims

ABSTRACT OF THE DISCLOSURE

This disclosure includes a weld head driven along a weld seam. A floating probe has a tip riding in the seam. The probe is supported at the outer end by a cantilever leaf spring and at the forward end by a pair of opposed loop springs secured to the top and bottom of the probe. A pair of linear variable differential transformers are mounted to the probe unit and the cores positioned in accordance with the weld seam.

---

This invention relates to a tool control tracer apparatus and particularly to a tracer apparatus for tracing of a seam for welding or the like.

In arc welding and the like, automatic apparatus is often required to follow a contoured weld seam which may move in any one of a plurality of directions. Various systems have been suggested for controlling the movement of a weld electrode in accordance with the changing contour of a weld seam. The application of Bollinger et al. entitled "Automated Control System for High Speed Arc Welding" which was filed on Apr. 18, 1966 with Ser. No. 543,160 discloses a reliable and practical probe follower system for accurate positioning of a welding head and electrode. In accordance with the teaching of that application, a probe rides in the seam in close proximity to the welding arc. The probe is coupled to a transducer which provides an electrical signal directly related to the change in the contour. These signals are incorporated in a servo drive to provide immediate repositioning and control of the welding apparatus. That application discloses a system for reliably positioning of the electrode in a given plane including the repositioning of the electrode tip in accordance with the movement in two perpendicular directions, and further providing rotation to maintain the electrode moving into the work area in a selected relationship with respect to a plane through the weld line or point.

Generally, as disclosed in that application, the welding apparatus with the electrode is driven with a given horizontal speed. A probe follows the seam line and is interconnected to a linear variable differential transformer unit and mounted to ride on the weld seam within 3 inches of the electrode tip. The probe senses any vertical displacement of the seam and provides a first voltage proportional thereto which is interconnected to directly drive the servo motor system and reposition the electrode in the corresponding direction. In addition, the weld nozzle is tilted about the horizontal axis perpendicular to the horizontal feed axis which is assumed for example, the X-axis. Rotation is determined by a suitable cam controlled system. This has been found to provide a highly desirable and very reliable welding apparatus for moving of a welding assembly in a given plane while maintaining the electrode in very desired predetermined desired position with respect to the depositing of the weld metal.

Although such an apparatus provides a highly suitable response to welding in a given plane, it often happens that the parts to be welded are substantially more complicated and move in an additional perpendicular plane. It is then desirable to not only control the machine in the two axes and the given angle in the one plane, but to correspondingly provide additional controls responsive to the perpendicular plane of movement. This requires controlling of the device in the three coordinate principal axes as well as two angles, one in the first plane and the second in the second plane. This introduces additional complications with respect to accurate tracking in both the first and second planes of movement.

The present invention is particularly directed to a reliable and sensitive floating type probe means which has been found to accurately produce output signals responsive to movement in either of the perpendicular planes through which the weld line may move. The movement in one plane is detected by an essentially straight line movement of the probe means while the second movement is detected by a pivotal movement of the probe means, with each movement coupled to a separate signal generator. The generators create a pair of individual signals, each of which is directly connected into a separate servo drive system for accurately positioning of the electrode. In accordance with the present invention, the probe tracer includes a follower or probe tip which rests on and is positioned by the welding seam. The follower is interconnected to a body portion or member which is guided for rectilinear movement within a suitable support means. The body portion is specially supported in accordance with the teaching of the present invention by a cantilever spring means interconnected to the rearward portion of such body portion. The forward end of the body portion is guided and supported by a pair of opposed spring means mounted in a given plane which is preferably the vertical plane. The three point spring suspension of the probe means has been found to provide a very reliable and accurate response to the in-out movement of the probe means as well as to the pivotal movement of the probe means in the vertical plane established by the corresponding changes in the weld seam.

In a particularly novel construction of the present invention, the rear cantilever spring means is a flat spring element interconnected to the support at one end and to the rearward end of the probe body portion at the opposite end. The connection to the fixed support includes adjustable means for accurately positioning the corresponding rearward end of the probe means.

Additionally, the forward spring supports are preferably loop flat spring members with relatively long flat side portions interconnected to the probe body portion and the support means and joined by curved, rolling end portions. The several spring elements are selected to have essentially similar or corresponding spring constants. Additionally, the output signals are generated by linear variable differential transformers secured to the support means. may be detected by an abutment on the body portion mounted through a sliding engagement to the lightweight core structure of the differential transformer. Similarly, the pivotal movement of the body portion or the probe means is detected by a sliding coupling between the lightweight core of the related differential transformer and the upper surface of the body portion.

The probe follower is, in accordance with another aspect of this invention, a pencil-like member which rides on the seam and which is angularly related with respect thereto to eliminate chatter and minimize the possibility of damaging the device as it rides over a hole or apertures and the like in the seam being traced. Additionally, the probe follower is preferably provided with an overriding limit control such that it cannot move excessively when encountering an aperture in the work. This limit control member may be connected to the follower and ride adjacent the seam. If the probe portion in the seam tends to move rapidly inwardly into an aperture, the limit member engages the work to positively stop the movement and thereby limit the movement.

The drawings furnished herewith illustrate the best mode presently contemplated by the inventors for carrying out the subject invention and disclose the above advantages and features as well as other which will be readily understood from the following description.

In the drawings:

FIG. 1 is an elevational view of a welding assembly constructed in accordance with the present invention;

FIG. 2 is a top elevational view of the assembly shown in FIG. 1;

FIG. 3 is a partial side elevational view of the assembly shown in FIG. 1;

FIG. 4 is an enlarged view of a transducer illustrating the mounting of a probe or tracer member mounted in a housing unit shown in FIGS. 1 through 3 inclusive;

FIG. 5 is a top view of the transducer shown in FIG. 4 with parts broken away and sectioned to more clearly show details of construction; and FIG. 6 is a vertical section taken generally on line 6—6 of FIG. 5.

Referring to the drawings and particularly to FIGS. 1 through 3 inclusive, the present invention is illustrated in connection with an automatic arc welding apparatus including a supporting frame structure 1 within which a pair of overlapping metal plates 2 and 3 are disposed and secured in fixed relationship by a clamp structure 4. The overlapping metal plates 2 and 3 are clamped in a vertical position to define a weld lap joint seam 5 at the position of overlap which is to be provided with a continuous interconnecting weld 5a. In the illustrated embodiment of the invention, an arc welding head 6 is movably supported within the supporting frame structure 1 to follow the weld seam 5 and to direct a weld electrode 7 toward the seam and by applying a welding potential between the electrode 7 and the plates 2 and 3 establishing a welding arc which continuously deposits electrode metal onto the seam 5. In the illustrated embodiment of the invention, the weld head 6 and in particular the tip of the weld electrode 7 may be positioned along the three coordinates axes of the Cartesian coordinate system as well as angularly oriented about two of the axes.

Generally, the supporting structure 1 includes a vertical column 8 within which a vertical positioning square shaft 9 is mounted. The weld head 6 is interconnected to the lower end of the vertical shaft 9 which defines the Y-way control or support for the weld head apparatus. The column 8 in addition is mounted by a X-way carriage or support 10 which in turn is movable along a Z-way support 11 to allow movement of the total assembly on the three coordinate axes with respect to the weld seam 5.

The overlapping plates 2 and 3 are secured within the structure with the seam 5 extending generally in a horizontal plane which is hereinafter defined or related to the X-coordinate axis direction of the Cartesian coordinate system.

The column 8 is driven along the X-way by an X-axis drive motor 12 as shown in FIG. 2. The Y-axis drive motor 13 is mounted to the top of the column 8 and coupled to the vertical shaft 9 for positioning of the weld head 6 in the Y-direction. A Z-axis drive motor 14 is provided for moving of the column 8 in the Z-axis direction along the supporting carriage. In addition to the three coordinate drives, the weld head 6 and attached electrode 7 are adapted to be positioned about a first angle in the X-Y or vertical plane. This movement is controlled by a theta axis motor 15 mounted in common with the weld head 6, as hereinafter described. A similar angular positioning is provided in the X-Z plane by a phi axis motor 16 mounted within column 8 and suitably coupled to shaft 9 to angularly orient the latter. The 5 coordinate movements of the electrode 7 maintain the electrode tip in a very precise relationship with respect to the seam 5 and insure that the electrode 7 is introduced and deposits the weld metal at optimum positioning.

A theta axis drive motor 15 coupled to head 6 controls the positioning of the head 6 and associated electrode 7 in the X-Y or vertical plane to maintain predetermined angular orientation to the weld in that plane. Similarly, a phi axis drive motor 16 angularly orients or positions the head 6 and associated electrode 7 in the X-Z or horizontal plane for correspondingly maintaining of the optimum introduction of the electrode into the seam. The motor 16 is mounted within the supporting column 8 and is coupled to a suitable gear drive mechanism to angularly position the supporting shaft 9 and thereby properly position the electrode in the X-Z plane in the illustrated embodiment of the invention.

Generally, each of the motors is controlled by a separate servo amplifier unit 17 shown in single block diagram in FIG. 1 for purposes of simplicity and clarity of explanation. Such systems are well-known in the art and consequently the detailed description thereof is not given.

The illustrated embodiment of the invention includes a 5 axis automatic seam tracker wherein the X-axis drive motor 12 is driven at a reference speed and the other four axes are under closed loop servo control systems. The X-axis constitutes the main horizontal extension of the weld. The Y-axis and Z-axis provide the two perpendicular coordinate movements and the theta and phi angular controls provide for the desired angular orientation about the Y-axis and the X-axis, respectively. The theta axis provides rotation about the horizontal axis perpendicular to the tangent at the weld point and more fully described in the previously referred to copending application. The phi-axis drive motor provides rotation about the Y-axis and in particular maintains the desired angle between the X-axis reference drive and the horizontal projection of the tangent to the weld point.

The present invention is directed to the actuation and energization of the Y-axis motor 13 and the Z-axis motor 14 and particularly the establishment of a pair of separate control signals by a transducer 18 having a probe tip 19 riding in the seam 5.

The very accurate tracking of the seam in the Z- and Y-axes presented one of the more difficult problems in the provision of a practical tracer, particularly where the output of the transducer is to directly reposition the work member. The transducer 18 of the present invention has been found to provide reliable and highly sensitive tracking with the output providing a proportional signal for directly actuating and positioning the weld head 6 and associated electrode 7.

More particularly, in the illustrated embodiment of the invention, an L-shaped mounting frame 20 is secured to the lower end of the shaft 9 as at 21. The L-shaped mounting frame 20 extends laterally outwardly from the work with a depending leg extending downwardly and terminating in a supporting base or plate 22. The transducer 18 and the arc welding head 6 are secured to the mounting plate 22 as presently described. A theta axis drive shaft 23 is journaled within suitable rotating supports 24. A weld nozzle 25 through which the electrode 7 is fed to the seam 5 is coupled to the shaft 23 by a coupling 26 such that the angular orientation of the shaft provides a corresponding angular orientation of the nozzle 25 and therefore of the emitting electrode 7 in the X-Y plane.

Referring particularly to FIGS. 4 through 6 inclusive, transducer 18 is connected to an L-shaped bracket 27 secured to the end of shaft 23. Bracket 27 includes a mounting end consisting of a pair of sidewalls 28 extending to the opposite sides of the shaft 23. A support block 29 includes a shaft opening 30 through which the shaft 23 passes. The opposite sides of the support block 29 are interconnected by similar tab and slot connections 31 within the sidewalls 28 to permit vertical positioning of the block and therefore the bracket 27.

A clamping bolt 32 extends downwardly through the support block 29 into clamping engagement with the shaft 23 to interconnect the block 29 to the shaft. This permits axial adjustment of the total assembly with respect to the weld seam 5. Additionally, as most clearly shown in FIG. 4, the side walls 28 include similar slots 33. Clamping bolts 34 extend through the slots and into a correspondingly threaded opening in the opposite sides of the block 29. This permits adjustment and locking of the clamping block 29 in the desired vertical position to thereby correspondingly position the probe assembly, as shown in FIGS. 4 and 5.

The transducer 18 includes a probe body portion 35 to which the probe tip 19 is attached. The probe body portion is shown as a rectangular block of a suitable heat conducting metal such as copper which is slidably mounted within a generally rectangular supporting frame or housing. The body is generally water cooled to remove heat from the probe arm as rapidly as practical. Generally, the housing includes a pair of apertured sidewalls 36 and 37 spaced generally in accordance with the width of the probe body portion 35. The sidewalls are interconnected by suitable screws or the like to a base wall 38 which in turn is adjustably interconnected to the bracket 27 as shown and to a top wall 39. The housing supports the probe body portion 35 for horizontal sliding movement and for limited vertical pivotal movement in the following manner.

A cantilevered spring member in the form of a flat leaf spring 40 is secured to the rearward or outermost end of the body portion 35. In the illustrated embodiment of the invention, the lower end of the spring 40 is clamped to the adjacent end of the body portion by a clamp block 41 and a pair of attachment screws 42 which extend through the block 41 and thread into the body portion. The opposite or upper end of the flat spring 40 is clamped between a pair of clamping blocks 43 and 44 and attached to the top wall 39 of the probe housing by one of the pair of clamping bolts 45, which extends through the blocks 43 and 44. The blocks 43–44 and the leaf spring 40 are provided with a vertical slot 46 in alignment with the upper one of the clamping bolts 45. This permits vertical positioning of the adjacent end of the probe body portion 35. Additionally, by varying the thickness of the inner clamping block 44, the axial position of the probe tip 19 can be adjusted. This provides for accurate positioning of the corresponding end of the probe follower 19 and body portion 35 in the Z and Y directions for alignment of the pivot point in the Y direction.

Additionally, a backing coil spring 47 is disposed between the back side of the clamp block 41 and a fixed support shown as the end 48 of shaft 23 secured to the bracket to provide positive outward bias of the probe means.

The forward end of the body portion 35 is supported by a pair of spring means 49 and 50 interconnected respectively to the top and bottom surfaces of the probe means and the adjacent housing. In the illustrated embodiment of the invention, each of the springs 49 and 50 is a similar spring metal band bent into a loop spring of a generally rectangular shape. The springs 49 and 50 are interposed between the forward end of the body portion 35 and the adjacent top and bottom walls 38 and 39 of the housing. The rectangular spring configuration including relatively long flat sides adjacent the corresponding surfaces and interconnected by end looped or curved end portions fore and aft. The springs are fixed to the adjacent surfaces by suitable attachment screws 51 with plate members 52 interposed or abutting the spring portion attached to the probe body portion 35. The loop type construction permits the rectilinear movement of the probe body portion 35 in the horizontal plan while also permitting the vertical pivotal movement of the body portion 35 with the pivot point being defined by the cantilevered spring 40 and its attachement to the body portion 35.

The applicant has found that the spring constant for the several springs 40, 49 and 50 should preferably be of the same magnitude or order. Furthermore, in a given application, applicant has found for arc welding apparatus, a spring constant of essentially .6 ounce per .05 inch of deflection provides a highly satisfactory construction.

The spring 40 is positioned such that the tilting point lies on the horizontal axis 53 through the body portion 35 which in turn is accurately positioned in alignment with the seam 5 and the tracking end of the probe tip 19.

The rectilinear motion and the pivotal motion of the body portion 35 are similarly individually detected, as follows.

The pivotal motion is sensed in the illustrated embodiment of the invention by a sensor shown as a linear variable differential transformer 54 which is mounted to the top wall 39 of the housing by suitable attachment bolts 55. The transformer 54 in accordance with well-known construction includes a fixed winding, not shown, to which suitable electrical input-output leads 56 are connected. The output is controlled by the actual positioning of a core 57 within the transformer 54. Generally, the core 57 includes an extension extending outwardly through an opening 58 in the top wall 39 of the transducer housing in alignment with the top looped spring 49 which is split at opening 58. The core 57 terminates in a Teflon or other suitable bearing end button 59 which is urged into sliding engagement with the backing plate or washer 52 to the back side of the loop spring 49 by a coil spring 60 encircling the core 57. Pivotal movement of the body portion 35 is reflected in a corresponding movement of the backup washer 52 with a corresponding positioning of the transformer core 57. The output of the transformer 54 is a voltage signal linearly proportional to the displacement of the body portion in the Y direction.

A second sensor 61 similar to the sensor 54, is secured to the one sidewall 37 with a core 62 terminating in a bearing button. A lightweight arm 63 is secured to the sidewall of the body portion 35 along the axis of movement and projects outwardly in front of the core 62. The spring loaded core 62 is thus urged into continuous engagement with the arm 63 such that the rectilinear movement of the probe body portion 35 in the Z-direction provides a corresponding displacement of the core 62. This, of course, generates a corresponding output signal which is employed to reposition the weld head 5 and particularly the electrode 7 with respect to the weld seam 5 to maintain the electrode in the desired Z coordinate position with respect to the weld seam 5.

Although the probe tip 19 may take any desired configuration including a straight line extension from the core body portion 35, it is preferably formed with a generally curved mounting arm 64, the inner end of which is clamped or bolted to the body portion 35 as at 65. The mounting arm 64 curves upwardly and laterally toward the weld seam 5 with the outer end of the arm disposed somewhat above the weld seam 5.

A pointed pencil-like follower 66 is welded, threaded or otherwise secured to the outermost end of the arm 64 and extends angularly downwardly toward the seam 5 with the outermost end terminating in a rounded end which may incorporate a wear-resistant insert riding on the upper edge of the one plate 2 and the adjacent sidewall surface of the overlapping plate 3. The tip or follower 66 engages the plates 2 and 3 in precise alignment with the extension of the axis of the body portion 35 in the X coordinate direction and in the X–Z plane through the axis. Thus, the probe follower 66 is disposed at an angle with respect to both the horizontal and vertical planes.

The probe follower 66 preferably includes an integral offset secondary probe limit arm 67 which extends downwardly and terminates adjacent the outer face of the first plate 2. In the illustrated embodiment, arm 67 includes a lower offset portion such that its end is disposed below and outwardly of the follower 66. The limit arm 67 is generally spaced outwardly of the face of the plate 2 by a limit greater than the different spacing encountered between the plates 2 and 3 to be welded. Thus, the second plate 3 may not always follow precisely the immediate edge of the first plate 2 as a result of manufacturing tolerances and the like. Plate 3 will, however, generally follow the same basic path in a Z-direction and consequently the follower 66 will normally be spaced from the plate 2 and therefore not perform any function. If the follower 66 should, however, encounter an opening or the like in the one plate 3, it would tend to move through the opening and create a large output signal to the coordinate servo system. The limit arm 67, however, will engage the adjacent surface of the plate 2 and thus limit the output signal and the positioning of the servo.

The probe tip 19 is preferably formed of copper or other material having excellent heat conducting qualities. The probe tip 19 is furthermore preferably clamped in heat exchange engagement to the body portion 35 such that the total probe assembly rapidly dissipates the heat resulting from the welding arc.

Additionally, the body portion 35 is preferably provided with a plurality of water-cooling passageways 68 interconnected to a suitable source of cooling liquid. A suitable cone-shaped shield 68a of copper or the like is shown connected to the transducer 18 and extending over the front of the transducer to further protect the transducer from spatter and the like.

Nylon bearings 69 or other similar low friction units are preferably provided between each side of the body portion 40 and the housing sidewalls 37 and 38 to establish minimal frictional forces and thereby provide sensitive response to the probe positioning.

In the operation of the illustrated embodiment of the invention, the weld head 6 and the attached transducer 18 are aligned with the starting position of the overlap plates 2 and 3. The nozzle 25 is energized to apply power to the electrode 7 and through a suitable feed system transports the electrode 7 to the seam 5. Simultaneously, the X-axis drive motor is energized to move the total assembly along the weld seam 5 in the X direction. The transducer 18 and particularly the probe follower 66 senses the seam 5 and provides the necessary signals for optimum positioning of the weld head 6 and attached electrode 7 in both the Y direction and Z direction. Thus, if the weld plate 3 moves outwardly in the Z direction, the probe follower 66 moves outwardly under the action of the cantilever spring 40 and the forward springs 49 and 50. This, in turn, repositions the core 62 of the differential transformer 61 and generates an electrical signal which is immediately transmitted back to the servo system for the Z-axis drive motor 14 and causes it to move the column 8 to which the weld head 6 is interconnected in the Z direction to reposition the electrode tip 7. This movement does not effect any of the other component directions and in particular the other differential transformer 54, the core 57 of which merely rides on plate 52 attached to transducer body 35.

Similarly, if the movement of the seam is only in the Y direction, the transducer probe follower 66 and attached body portion 35 pivots about the cantilever pivot spring 40. This, in turn, results in a corresponding repositioning of the core 57 of transformer 54 which is maintained in engagement with the upper end of the top wall of the body portion. As the differential transformer 54 is disposed immediately adjacent the forward end of the body portion 35 and the pivot point is at the opposite end of the body portion, maximum movement is detected.

Furthermore, the pivotal movement is not significantly transmitted to the core 62 of the other transformer 61. The control arm 63 and the core 62 are mounted in precise alignment with the horizontal axis of the body portion 40 and the pivot axis. Furthermore, by having the core 62 projecting rearwardly, the control arm 63 is placed close to the pivot point and thus produces minimal angular displacement. The body portion 35 rotates about the axis point of the cantilever spring 40 and the pivotal movement does not change the horizontal displacement of the control point and the core in any detectable manner.

Correspondingly, if there is a displacement in both the Z and the Y direction, the probe follower 66 will correspondingly move in a rectilinear manner along the Z-axis and simultaneously pivot about the pivot point at the cantilevered spring 40 to simultaneously position the two differential tranformer cores 57 and 62. This, in turn, will immediately establish two different output signals for simultaneously driving the respective servo systems. If the probe follower 66 encounters an opening or the like in the plate 3, it will of course tend to move into and through the opening 1. The angular orientation of the probe follower 66 will tend to span the opening and limit the movement. Furthermore, the secondary probe or limit arm 67 will move into engagement with the vertical surface of the outer plate 2 and thereby positively provide a secondary limit to the movement of the probe. This, in turn, limits the output signal of the differential transformer 54 to maintain the desired operation and stability of the servo system.

The cantilevered, adjustable mounting of the spring provides accurate positioning with respect to the theta axis and has been found to be very important to the construction of a practical transducer and probe follower. Actual tests conducted with a welding apparatus constructed in accordance with the present invention has shown that the transducer provides a highly practical and accurate control of the weld head in the Y and Z coordinate directions. As previously noted, the control of the movement in the X direction is controlled by maintaining a constant X reference speed while the movement about the rotational axes are through any other suitable control such as shown in thesis papers which were filed in the public library at the University of Wisconsin as follows: Fianl Report for Phase 1 of the Design of a 5-Axis Seam Tracker For High Speed Production Welding; Submitted by: Research Assistants Knut E. AAS, Rune W. Harboe and James A. Bonesho & Professors John G. Bollinger and Howard L. Harrison.

The present invention provides a sensitive and stable floating type support for the tracer which creates signals which can be employed to establish accurate positioning of the electrode or other work member.

We claim:

1. A tracer-apparatus for sensing the position of a member in at least two perpendicular directions of movement within a plane and having means for moving the apparatus normal to said plane, comprising a movable support means, a probe means having a follower element adapted to be coupled to said member and detect changes as the apparatus moves normal to said plane, said probe means being mounted within said support means for movement with a rectilinear motion in one of said directions and in a pivotal motion in the second of said directions, a cantilever spring means secured to said support means and said probe means in spaced relation to said element to define a first support, said cantilevered spring means permitting both rectilinear and pivotal motion, a pair of opposed forward spring means coupled to the opposite sides of the probe means in the second line of movement and to said support means to define a second support for said probe means permitting both said rectilinear and pivotal motion, said spring means being disposed intermediate said follower element and said cantilever spring means, and sensing means coupled to the probe means to separately sense the rectilinear movement and the pivotal movement and produce corresponding output signals.

2. The tracer apparatus of claim 1 wherein said sensing means including a first differential transformer means mounted to the support means adjacent the forward spring means and including a movable element for changing the transformer output, said movable element extending into sliding engagement with said probe means and moving in said second direction with said probe means to sense only the pivotal movement, said sensing means includes a second corresponding differential transformer means having a movable element and mounted with the movable element aligned with and movable parallel to the rectilinear motion of said probe means, and means connecting said probe means to said movable member of said second differential transformer to transmit only the rectilinear movement of the probe means.

3. The tracer apparatus of claim 1 wherein said probe means includes a body portion mounted within said support means and connected to said follower element, said cantilever spring means secured to said body portion to define a pivot point as said first support in alignment with the engagement of the follower element and the member, said pair of opposed forward spring means disposed in the plane of pivotal movement of the probe body portion and coupled to said body portion as said second support.

4. The tracer apparatus of claim 1 wherein said sensing means includes a pair of separate sensors each having an input member coupled to the probe means to separately sense the rectilinear movement and the pivotal movement, the input member of the sensor for detecting the pivotal movement being coupled to the probe means adjacent the follower element and thereby in spaced relation to the cantilevered spring means.

5. The tracer apparatus of claim 1 for welding a pair of overlapping plate members and wherein said follower element includes a tip adapted to ride on the edge of one of the plate members and slidably engage the face of the adjacent plate member, said spring means urging said tip into said engagement with said plate members, and means to effectively limit the movement of the tip and thereby the actuation of the sensing means.

6. The tracer apparatus of claim 1 wherein the member is a weld seam, said probe means includes a body portion mounted in said support means to move in a horizontal line perpendicular to the weld seam and in a pivotal motion in a perpendicular plane through said horizontal line, said cantilevered spring means being secured to the back end of said body portion as said first support, said pair of opposed forward spring means being disposed in said perpendicular plane and coupled to the front end of the body portion as said second support, said sensing means including a first sensor having a follower element movable along said horizontal line and coupled to the body portion adjacent the cantilevered spring means to sense the rectilinear movement and a second sensor having a follower element movable in said perpendicular plane and coupled to the body portion adjacent the forward spring means to sense the pivotal movement of the body portion and produce corresponding output signals.

7. The tracer apparatus of claim 6 wherein said first sensor is a first differential transformer means mounted to the support means adjacent the forward spring means and including a movable element for changing the transformer output, said movable element extending in said second direction into sliding engagement with said body portion to sense only the pivotal movement, said second sensor is a second corresponding differential transformer means having a movable element and mounted with the movable element aligned with and movable parallel to the rectilinear movement of said body portion, and a coupling arm coupled to said body portion and said movable member of said second differential transformer to transmit only the rectilinear movement of the probe means.

8. The tracer apparatus of claim 1 wherein said spring means have substantially the same spring constant.

9. The tracer apparatus of claim 1 wherein said cantilevered spring means includes a flat leafspring member having a flat portion secured to the probe means and a curved portion extending therefrom, and an adjustable mounting means secured to the outer end of the spring member and to the suport means and including means for movement along the two perpendicular lines of movement.

10. The tracer apparatus of claim 1, for welding a pair of overlapping plate-like metal members along a weld seam at the edge of the one metal member wherein said follower element having a wear resistant tip of a high thermal conductivity adapted to ride on the top edge of the one metal member and against the face of the immediately adjacent overlapping metal member, said probe means includes a rectangular probe body member formed of a lightweight material connected to said follower element, said support means including a housing mounted to be moved along said edge and having said probe body member disposed therein, said cantilevered spring means including a leaf-member secured to the rearward end of the body member and to the housing to constitute the sole support for the rearward end of the probe means, said opposed spring means each including a generally rectangular loop of a flat spring member having curved ends and having straight top and bottom sides secured respectively to the housing and to the forward end of the body member to constitute the sole support for the forward end of the probe means, the axis of rectilinear motion extending perpendicularly to the weld seam in a horizontal plane through the weld seam and the pivot point being on said axis at the cantilevered leaf-member.

11. The tracer apparatus of claim 10 wherein said spring members are selected to establish essentially the same spring constants.

12. The tracer apparatus of claim 1 for positioning a weld electrode in accordance with the weld seam defined by overlapping metal plates wherein said follower element is a pencil-like member having a high thermal tip adapted to ride the edge of the one plate and against the face of the immediately adjacent overlapping plate at the weld seam, said probe means includes a rectangular probe body member formed of a metal having a high heat conductivity, said support means includes a housing mounted to be moved along said edge and having said probe body member disposed therein, a curved arm member secured to the forward end of the body member and to the follower element and locating said pencil-like member to extend outwardly and upwardly in the direction of movement from the engagement with said plates, said cantilevered spring means including a leaf-member secured to the rearward end of the body portion and to the housing to constitute the sole support for the rearward end of the probe body member, said opposed spring means each including a generally rectangular loop of a flat spring member having curved ends and having straight top and bottom sides secured respectively to the housing and to the forward end of the body member, said spring members locating said body member and said tip to move with said rectilinear motion in a horizontal plane and on a line perpendicular to the seam and to pivot about a point on said line and at said leaf-member.

13. The tracer apparatus of claim 1 wherein said follower element is a pencil-like member having a tip adapted to ride on the top edge of a plate and against the face of an immediately adjacent overlapping plate, said probe means includes a rectangular probe body member formed of a lightweight metal having a high heat conductivity, said support means includes a tubular housing having said probe body member disposed therein, and mounted to be moved along said edge, a curved arm member secured to the forward end of the body member and to the follower element and locating said pencil-like member to extend outwardly and upwardly in the direction of movement from the engagement with said plates, said cantilevered spring means including a leaf-member secured to the rearward end of the body portion and to the housing to constitute the sole support for the rearward end of the probe means, said opposed spring means each including a generally rectangular loop of a flat spring member having curved ends and having straight top and bottom sides secured respectively to the housing and to the forward end of the body member.

14. The tracer apparatus of claim 13 wherein said sensing means includes a first differential transformer means mounted to the housing adjacent the forward spring means and including a lightweight movable element for changing the transformer output, said movable element extending into sliding engagement with the forward end of said probe body member to sense only the pivotal movement, said sensing means includes a second corresponding differential transformer means having a movable element and mounted with the movable element aligned with and movable parallel to the rectilinear motion of said probe body member, and means connecting the center of said body member and the outer end of said movable element of said second differential transformer to transmit only the rectilinear movement of the probe means.

15. A tracer-apparatus for sensing the position of a member in at least two perpendicular directions of movement within a plane and having means for moving the apparatus normal to said plane, comprising a movable support means, a probe means having a follower element adapted to be coupled to said member and detect changes as the apparatus moves normal to said plane, said probe means being mounted within said support means for movement with a rectilinear motion in one of said directions and in a pivotal motion in the second of said directions, a cantilever spring means secured to said support means and said probe means in spaced relation to said element to define a first support, said cantilevered spring means permitting both rectilinear and pivotal motion, a second spring means coupled to the probe means and to said support means to define a second support for said probe means permitting both said rectilinear and pivotal motion, said second spring means being disposed intermediate said follower element and said cantilever spring means, and sensing means coupled to the probe means to separately sense the rectilinear movement and the pivotal movement and produce corresponding output signals.

References Cited
UNITED STATES PATENTS

| | | | |
|---|---|---|---|
| 2,395,525 | 2/1946 | Wilkie et al. | 90—62 |
| 2,827,548 | 3/1958 | Griswold | 219—125 |
| 2,839,663 | 6/1958 | McCollum | 219—76 |
| 3,084,246 | 4/1963 | Rieppel et al. | 219—137 X |
| 3,122,970 | 3/1964 | Rhoades | 336—30 X |
| 3,171,012 | 2/1965 | Morehead | 219—124 |
| 3,199,056 | 8/1965 | Cameron | 336—30 |
| 3,281,047 | 10/1966 | Weicht | 219—125 X |

JOSEPH V. TRUHE, Primary Examiner

L. A. SCHUTZMAN, Assistant Examiner

U.S. Cl. X.R.

90—62; 228—8; 318—18

UNITED STATES PATENT OFFICE
CERTIFICATE OF CORRECTION

Patent No. 3,530,273                Dated September 22, 1970

Inventor(s) J. G. Bollinger et al

It is certified that error appears in the above-identified patent and that said Letters Patent are hereby corrected as shown below:

Column 2, line 54, after the period insert (The rectilinear movement of the probe means)

Column 5, line 71, cancel "plan" and substitute (plane)

Column 8, line 40, cancel "Fianl" and substitute (Final)

SIGNED AND SEALED
DEC 22 1970

(SEAL)
Attest:

Edward M. Fletcher, Jr.
Attesting Officer

WILLIAM E. SCHUYLER, JR.
Commissioner of Patents